United States Patent
Allain et al.

(10) Patent No.: US 7,614,231 B2
(45) Date of Patent: Nov. 10, 2009

(54) METHOD AND SYSTEM TO OPERATE DIESEL ENGINE USING REAL TIME SIX DIMENSIONAL EMPIRICAL DIESEL EXHAUST PRESSURE MODEL

(75) Inventors: Marc Christian Allain, Plymouth, MI (US); Min Sun, Troy, MI (US)

(73) Assignee: Detroit Diesel Corporation, Detroit, MI (US)

( * ) Notice: Subject to any disclaimer, the term of this patent is extended or adjusted under 35 U.S.C. 154(b) by 232 days.

(21) Appl. No.: 11/784,625

(22) Filed: Apr. 9, 2007

(65) Prior Publication Data

US 2008/0245070 A1    Oct. 9, 2008

(51) Int. Cl.
- F02B 33/44 (2006.01)
- F02D 23/00 (2006.01)
- F02M 25/07 (2006.01)
- G01M 15/00 (2006.01)

(52) U.S. Cl. .................. 60/605.1; 60/600; 60/601; 60/602; 60/605.2; 701/102; 701/108; 73/117.03; 73/118.01; 73/118.02

(58) Field of Classification Search .......... 60/600–603, 60/605.1, 605.2; 701/102, 108, 110, 112; 73/117.3, 118.1–118.2
See application file for complete search history.

(56) References Cited

U.S. PATENT DOCUMENTS

| | | | |
|---|---|---|---|
| 5,303,168 A * | 4/1994 | Cullen et al. ................ 701/108 |
| 6,076,353 A * | 6/2000 | Freudenberg et al. ....... 701/108 |
| 6,283,101 B1 * | 9/2001 | Hulsmann et al. .......... 701/108 |
| 6,311,484 B1 | 11/2001 | Roth et al. ..................... 60/286 |
| 6,352,065 B1 * | 3/2002 | Wild et al. ................... 701/108 |
| 6,367,319 B2 * | 4/2002 | Hartke et al. ............. 73/114.76 |
| 6,422,219 B1 | 7/2002 | Savonen et al. ............ 60/605.2 |
| 6,446,430 B1 | 9/2002 | Roth et al. ..................... 60/286 |
| 6,460,522 B1 | 10/2002 | Rimnac ...................... 60/605.2 |
| 6,508,242 B2 | 1/2003 | Jaliwala et al. .............. 123/676 |
| 6,697,729 B2 | 2/2004 | Wright ...................... 60/605.2 |
| 6,701,710 B1 | 3/2004 | Ahrens et al. ............. 60/605.2 |
| 6,708,104 B2 | 3/2004 | Avery, Jr. et al. ........... 701/110 |
| 6,718,767 B1 * | 4/2004 | Caddy ......................... 60/602 |
| 6,732,522 B2 | 5/2004 | Wright et al. ............. 60/605.2 |
| 6,837,217 B1 | 1/2005 | Hoshino et al. ............. 123/399 |
| 6,850,833 B1 * | 2/2005 | Wang et al. ................. 701/108 |
| 6,868,329 B2 * | 3/2005 | Ito et al. ...................... 701/108 |
| 6,882,929 B2 | 4/2005 | Liang et al. ................. 701/115 |
| 6,965,826 B2 | 11/2005 | Andres et al. ............... 701/102 |
| 6,985,808 B1 * | 1/2006 | Kennedy ..................... 701/108 |
| 7,117,078 B1 * | 10/2006 | Gangopadhyay ............ 701/103 |
| 7,143,578 B2 | 12/2006 | Kakwani et al. .............. 60/286 |
| 7,174,250 B2 * | 2/2007 | Barba et al. ................. 701/108 |
| 7,191,052 B2 * | 3/2007 | Barba et al. ................. 701/108 |
| 7,222,615 B2 * | 5/2007 | Buck et al. .............. 123/568.12 |
| 7,269,497 B2 * | 9/2007 | Schreurs et al. ............. 701/108 |
| 7,438,061 B2 * | 10/2008 | Wang et al. ............. 123/568.11 |
| 2006/0011159 A1 | 1/2006 | Bloms et al. ............. 123/90.12 |
| 2006/0288701 A1 | 12/2006 | Ramamurthy et al. ...... 60/605.2 |
| 2008/0149081 A1 * | 6/2008 | Allain ................... 123/568.21 |
| 2008/0216557 A1 * | 9/2008 | Wang et al. ................ 73/23.31 |

* cited by examiner

*Primary Examiner*—Thai Ba Trieu
(74) *Attorney, Agent, or Firm*—Bill C. Panagos; Rader, Fishman & Grauer, PLLC

(57) ABSTRACT

A method to estimate real-time exhaust pressure in a compression ignition engine with variable geometry turbocharger and an EGR by adding the turbocharger RPM, the engine RPM, EGR value position and intake manifold pressure to determine a final turbocharger turbine inlet pressure to control NOx emissions.

5 Claims, 3 Drawing Sheets

METHOD AND SYSTEM TO OPERATE DIESEL ENGINE USING REAL TIME SIX DIMENSIONAL EMPIRICAL DIESEL EXHAUST PRESSURE MODEL

BACKGROUND OF THE INVENTION

1. Field of the Invention

Modern on-highway diesel engines require the use of exhaust gas recirculation (EGR) systems. It consists of cooled exhaust gases being routed from the exhaust system (typically the turbocharger turbine inlet) to the intake manifold (usually downstream of the turbocharger compressor). EGR enables reduced combustion temperatures by diluting fresh intake air, reducing overall intake charge oxygen concentration and thereby increasing ignition delay. This, in turn, enables reduced formation of Oxides of Nitrogen (NOx), which is a result of the diesel engine combustion process. EGR flow is the result of the pressure differential between the exhaust and intake systems. A valve (poppet, check or butterfly type) is usually inserted in the EGR pipe. Controlling the EGR flow rate is critical to engine emissions control, and EGR flow control necessitates real-time knowledge of exhaust pressure. The invention described here shows an empirical method developed to estimate exhaust pressure in real-time, using a combination of three (3) two-dimensional tables. Due to the nature of exhaust gases (high temperature, high water vapor and soot content), the use of a physical pressure sensor is usually impractical, especially when put into perspective of heavy-duty diesel engine durability requirements.

The present invention relates to a method and system to operate a diesel engine using real time six dimensional empirical diesel exhaust pressure model.

The present invention further relates to a method to estimate real time exhaust pressure in an internal combustion engine to control EGR flow rate and combustion emissions.

The present invention further relates to a method and system to operate a heavy duty diesel engine to control EGR flow rates and exhaust emissions.

2. Description of the Related Art

Ramamurthy et al., U.S. Patent Application Publication 2006/0288701 is directed to a method for controlling exhaust gas particulate emission from a compression ignition engine having a variable geometry turbocharger (VGT) includes the steps of determining back pressure across the engine and air mass flow into the engine, closing the vanes of the VGT to provide air mass flow increase when backpressure is increasing, and stopping the step of closing the vanes of the VGT when a decrease in rate of change of air mass flow is determined.

Wright et al., U.S. Pat. No. 6,732,522 discloses a system for estimating the engine exhaust pressure that includes a pressure sensor fluidly coupled to an intake manifold on the engine, a turbocharger having a turbine fluidly coupled to an exhaust manifold of the engine, a control actuator responsive to a control command to control either of a swallowing capacity and a swallowing capacity of the turbine, and a control computer estimating engine exhaust pressure as a function of the pressure signal and the control command. In an alternative embodiment, the system includes an engine intake manifold and the exhaust manifold, and an EGR valve position sensor. The control computer is operable in this embodiment to estimate engine exhaust pressure as a function of the pressure signal, the control command, the engine speed signal and the EGR valve position signal.

SUMMARY OF THE INVENTION

The present invention is directed to a method to estimate real time exhaust pressure in an internal combustion engine with an exhaust gas recirculation system (EGR), ECM with memory and a turbocharger with an inlet, to control EGR flow rate and combustion emissions. The method comprises using the turbocharger RPM, engine RPM, engine load, EGR valve position, intake manifold temperature and VGT vanes position as inputs to two-dimensional tables, which are summed to estimate the turbocharger turbine 3 inlet pressure.

The method further includes measuring turbocharger RPM, engine RPM; VGT vane position, engine load, EGR valve position (wherein EGR valve position may be measured as a function of percent the EGR valve is open) and intake manifold temperature. These values are used as inputs in at least one table within memory of the ECM; each said table generated according to the formula:

$$z = c_1 x^2 + c_2 x + c_3 y^2 + c_4 y + c_5 x^2 y^2 + c_6 xy + c_7 x^2 y + c_8 xy^2 + c_9$$

wherein: z is the table output (turbine inlet pressure)
x is the first input to the table (e.g. turbocharger RPM)
y is the second input to the table (e.g. VGT vanes position)
$c_1; c_2; c_3; c_4; c_5; c_6; c_7; c_8; c_9;$ are coefficients of the polynomial used as underlying turbine inlet pressure model.

The method may further include the steps of:
assuming a fixed model $z=a*c$
where a is the vector $a=[x^2 \ x \ y^2 \ y \ x^2 y^2 \ xy \ x^2 y \ xy^2 \ 1]$
solving for the coefficients of the vector c $$c=[A'^{*}A]^{-1}*A'^{*}Z$$

The method of the present invention is useful in reducing the exhaust gas emissions, most particularly NOx from a compression ignition internal combustion engine.

DETAILED DESCRIPTION OF PREFERRED EMBODIMENT(S)

Figure 1:
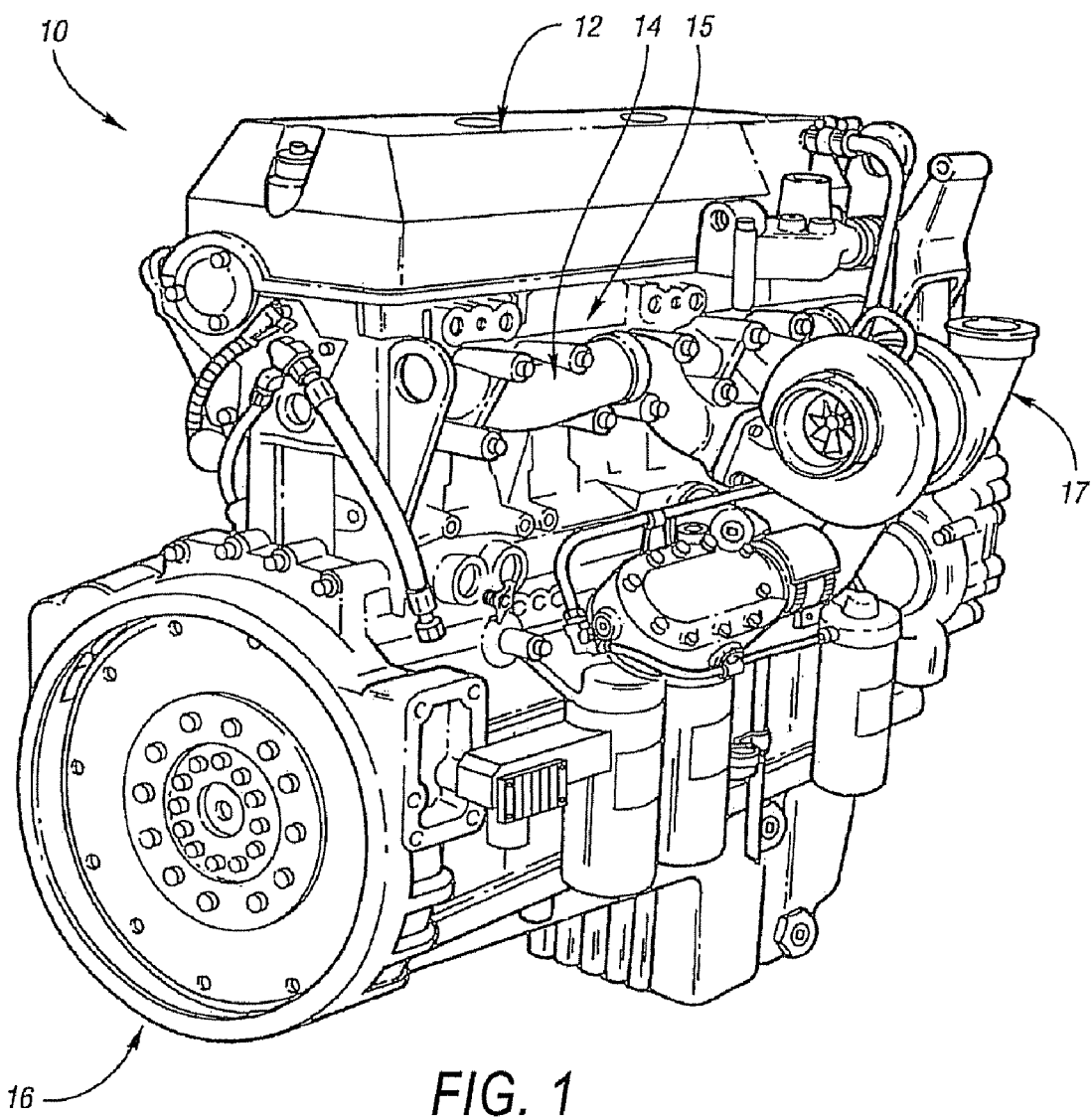
FIG. 1 is a perspective view of a heavy duty compression ignition engine.

With reference to the Figures, the preferred embodiments of the present invention will now be described in detail. Generally, the present invention provides an improved system and an improved method for continuously controlling exhaust gas emissions, particularly NOx, from a compression ignition internal combustion engine.

The present invention is generally implemented in connection with an internal combustion engine (e.g., a compression ignition or diesel engine) having an EGR system, a turbo charger, preferably a variable geometry turbine turbocharger (VGT), and an exhaust system having diesel exhaust aftertreatment. An EGR system generally introduces a metered portion of the engine exhaust gases into the intake manifold. The EGR system generally dilutes the incoming air and fuel charge with the exhaust gases and lowers combustion temperatures to reduce the level of oxides of nitrogen.

To control or optimize at least one mode of the engine (e.g., an internal combustion engine in general and a compression ignition engine in particular) operation, VGT operation, and EGR operation where the respective operations are generally controlled by an electronic control module (ECM)/powertrain control module (PCM) or controller, the engine controller may be adaptable (i.e., programmable, modifiable, configurable, etc.) to a variety of input signals or parameters, for all operating (i.e., steady-state and transitional, idle, wide-open-throttle, partial throttle, highway speed, city traffic, etc.) conditions, continuously, and in real-time.

Turbine inlet pressure may be affected by engine components other than emission control devices. For example, turbine inlet pressure may be controlled to achieve a desired EGR flow using a turbocharger, such as a variable geometry turbocharger (VGT).

When turbine inlet pressure is not properly controlled, the deficiencies in emission control can occur. In particular, it may be desirable to provide compensation for turbine inlet pressure when there is a decrease in air flow through the engine. The present invention is a method to operate a diesel engine using a real time six dimensional empirical diesel exhaust pressure model for estimating the turbine inlet pressure to assist the real time control of the EGR system to reduce NOx exhaust emissions.

The system and method of the present invention generally includes determining the final turbocharger inlet pressure by determining VGT vane position and RPM of the turbocharger, Engine RPM, Engine Load, EGR Valve position and intake manifold temperature. The turbocharger inlet pressure is calculated by the summation of the three two-dimensional tables, which use turbocharger RPM, VGT vanes position, engine RPM, engine load, EGR valve position and intake temperature as inputs. The turbocharger inlet pressure is then used to modify operation of the EGR valve to reduce NOx emissions in a heavy duty diesel engine.

The method further includes measuring turbocharger RPM, VGT vane position, engine load, EGR valve position (wherein EGR valve position may be measured as a function of percent the EGR valve is open) and manifold temperature. Each table is populated using a polynomial fit according to the formula:

$$z = c_1 x^2 + c_2 x + c_3 y^2 + c_4 y + c_5 x^2 y^2 + c_6 xy + c_7 x^2 y + c_8 xy^2 + c_9$$

wherein: z is the table output (turbine inlet pressure)
x is the first input to the table (e.g. turbocharger RPM)
y is the second input to the table (e.g. VGT vanes position)
$c_1$; $c_2$; $c_3$; $c_4$; $c_5$; $c_6$; $c_7$; $c_8$; $c_9$; are coefficients of the polynomial.

The method may further include the steps of:
assuming a fixed model z=a*c
where a is the vector a=[$x^2$ x $y^2$ y $x^2y^2$ xy $x^2y$ $xy^2$ 1]
solving for the coefficients of the vector c $$c = [A'^*A]^{-1} A'^* Z$$

The system and method of the present invention may yet further provide for including real-time determination (e.g., calculation) of NOx emissions and providing for continuous turbine inlet pressure control and compensation in response to the real-time determination of NOx emissions. The system and method of the present invention generally provide for appropriate signal filtering and tuning (e.g., including hysteresis) to reduce or eliminate undesirable transitions between modes of operation of the turbine inlet pressure control and compensation (e.g., transitions generated during changes of modes of operation of the engine where the system and method of the present invention are implemented).

Referring to FIG. 1, a perspective view illustrating a compression-ignition internal combustion engine 10 incorporating various features according to the present invention is shown. The engine 10 may be implemented in a wide variety of applications including on-highway trucks, construction equipment, marine vessels, stationary generators, pumping stations, and the like. The engine 10 generally includes a plurality of cylinders disposed below a corresponding cover, indicated generally by reference numeral 12.

In a preferred embodiment, the engine 10 is a multi-cylinder compression ignition internal combustion engine, such as a 3, 4, 6, 8, 12, 16, or 24 cylinder diesel engine. However, the engine 10 may be implemented having any appropriate number of cylinders 12, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankine cycle, Miller cycle, etc.) using an appropriate fuel to meet the design criteria of a particular application.

Figure 2:
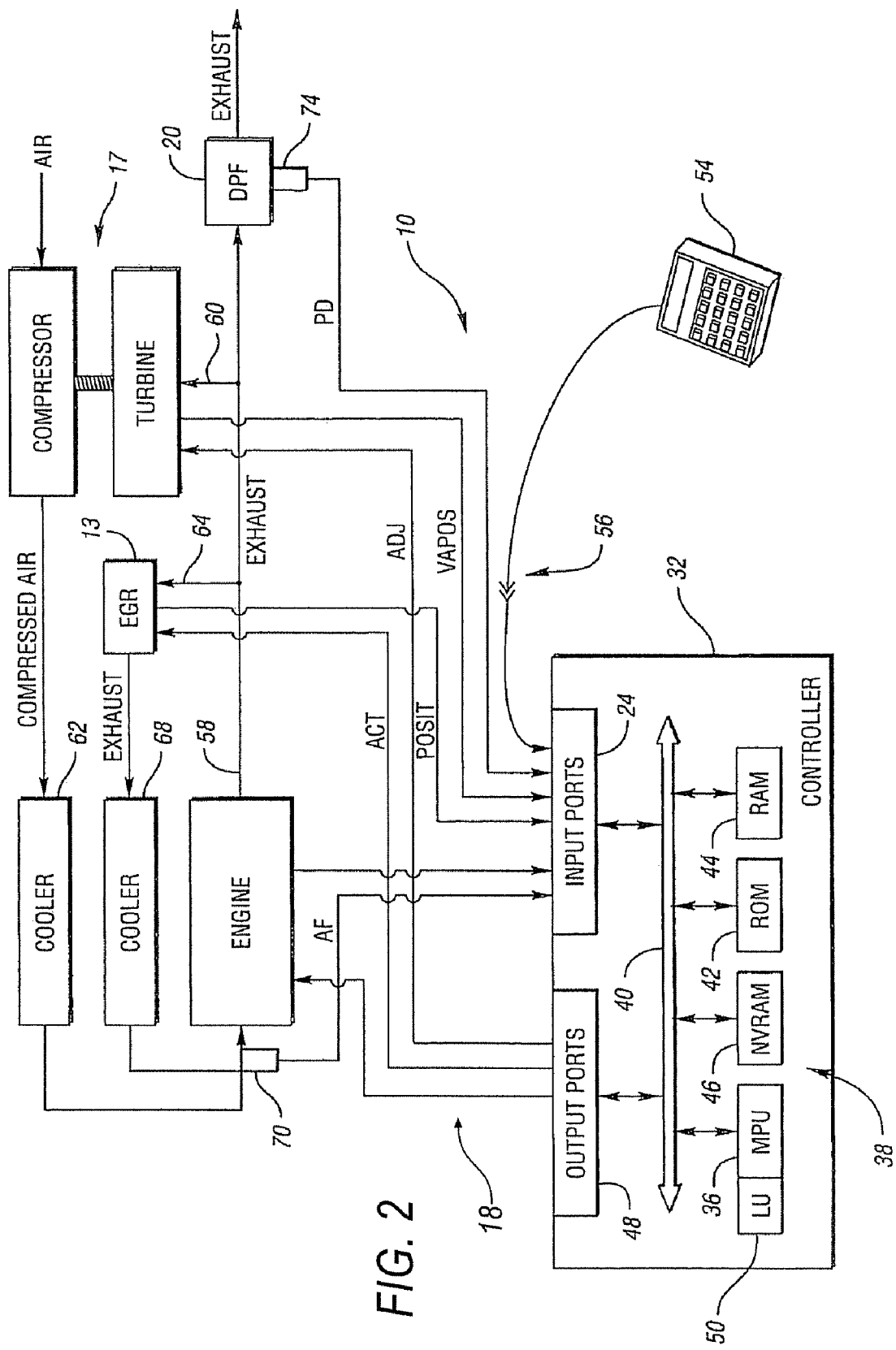
FIG. 2 is a schematic representation of a compression ignition engine and associated control systems.

An EGR valve 13 as seen in FIG. 2, is generally connected between an exhaust manifold 14 and an intake manifold 15. The EGR valve 13 generally provides recirculation of a portion of exhaust gas in response to at least one predetermined engine 10 operating condition (e.g., a time in EGR, a load presented to the engine, a position of turbocharger turbine vanes, changing of position, i.e., opening and closing of turbocharger turbine vanes, etc.). The EGR valve 13 is generally implemented as a variable flow device. The EGR valve 13 generally includes an actuator that opens and closes the EGR valve an amount (i.e., level, to a position, etc.) that corresponds to (i.e., in response to) a control signal (e.g., ACT), and a sensor that generates a position signal (e.g., POSIT) that corresponds to (i.e., in response to) the amount of opening (or closing) of the EGR valve.

A turbocharger 17 may be installed in the engine 10 exhaust stream and may provide pressurized air to the intake manifold 15. The turbocharger 17 may be implemented as a variable geometry device (VGT, also called a variable gate turbocharger, and also called variable turbine geometry (VTG)). The VGT turbocharger 17 generally has movable turbine vanes that pivot to adjust boost pressure in response to engine speed and load. Cross-sectional changes are made by resetting the turbine blades (e.g., smaller contact surface at low speeds, smaller contact surface at high speeds). VTG turbochargers such as the VGT 17 may be particularly efficient at partial load and generally reduce or eliminate "turbo lag". VTG turbochargers can increase effective engine power, increase throttle response and can also have a beneficial effect on particulate emissions. The VGT 17 generally includes an actuator that opens and closes the VGT turbine vanes an amount (i.e., level, to a position, etc.) that corresponds to (i.e., in response to) a control signal (e.g., ADJ), and a sensor that generates a position signal (e.g., VAPOS) that corresponds to (i.e., in response to) the amount of opening of the VGT turbine vanes.

The engine 10 generally includes an engine control module (ECM), powertrain control module (PCM), or other appropriate controller 32 (shown and described in detail in connection with FIG. 2). The ECM 32 generally communicates with various engine sensors and actuators via associated interconnection cabling (i.e., leads, wires, connectors, etc.) 18, to control the engine 10 and at least one of the EGR valve 13 and the VGT 17. In addition, the ECM 32 generally communicates with an engine operator or user (not shown) using associated lights, switches, displays, and the like (not shown).

In one example, the engine 10 may be mounted (i.e., installed, implemented, positioned, disposed, etc.) in a vehicle (not shown). In another example, the engine 10 may be installed in a stationary environment. The engine 10 may be coupled to a transmission (not shown) via flywheel 16. Many transmissions include a power take-off (PTO) configuration where an auxiliary shaft (not shown) may be connected to associated auxiliary equipment (not shown). However, the present invention is independent of the particular operation mode of the engine 10, or whether the vehicle is stationary or moving for the applications in which the engine 10 is used in a vehicle having a PTO mode. The loads presented to the engine 10/transmission in a stationary configuration may be relatively constant or may vary.

Referring to FIG. 2, the internal combustion engine 10 and associated control system (or controller) 32 and subsystems are shown. Various sensors and switches (not shown) are generally in electrical communication with (i.e., are connected or coupled to) the controller 32 via input ports 24. The sensors may include various position sensors such as an accelerator or brake position sensor. Likewise, the sensors may include a coolant temperature sensor that generally provides an indication of the temperature of an engine block and an intake manifold air temperature sensor that generally provides an indication of the temperature of the engine intake air at the inlet or within the intake manifold 15. Moreover, the sensors may include an engine RPM sensor that generally provides an indication of the crankshaft rotational velocity. In addition, the sensors may include a turbocharger RPM sensor that generally provides an indication of the turbocharger shaft rotational velocity.

Likewise, an oil pressure sensor may be used to monitor the engine 10 operating conditions by providing an appropriate signal to the controller 32. Other sensors may include at least one sensor that indicates actuation (e.g., position, percentage of open, etc.) of the EGR control valve 13 (e.g., via the signal POSIT), at least one sensor that indicates actuation of the VGT 17 (e.g., via the signal VAPOS), at least one sensor that indicates actuation of at least one cooling fan, and at least one sensor that indicates rotational speed of the at least one cooling fan.

The engine 10 generally has an exhaust output that present a portion of exhaust 58 (e.g., a portion 60) to the VGT 17 and the remainder of the exhaust gas through an exhaust system that includes a diesel particulate filter (DPF) 20.

In one example, an air flow mass (or mass air flow) sensor 70 may be implemented to provide an indication of the air flow through the engine 10 (e.g., via a signal AF). The sensor 70 is generally placed in the incoming air stream to the engine 10. The air flow sensor 70 generally presents a signal (e.g., via the signal AF) that is representative of the air mass flow to a respective input port 24.

In another example, the signal AF (i.e., the signal corresponds to the air mass flow into the engine 10) may be generated using a virtual sensor. The controller 32 may dynamically determine an appropriate value (i.e., a virtual sensor signal value) for the signal AF in real time in response to engine operating conditions as determined using signals generated by the sensors coupled to the input ports 24 as described herein. In particular, engine intake mass air flow may be directly proportional to engine RPM and intake manifold pressure and indirectly proportional to intake manifold temperature. As such, sensor signals that correspond to engine RPM, intake manifold pressure, and intake manifold temperature may be used to generate (e.g., calculate, determine, etc.) the virtual sensor signal AF. However, an appropriate virtual sensor may be determined using any appropriate parameters to meet the design criteria of a particular application. Moreover, air pressure at the turbine inlet is calculated, not measured.

Other sensors may include rotational sensors to detect the rotational speed of the engine 10, such as an RPM sensor and a vehicle speed sensor (VSS) in some applications. The VSS generally provides an indication of the rotational speed of the output shaft or tailshaft (not shown) of the transmission. The speed of the shaft monitored via the VSS may be used to calculate the vehicle speed. The VSS may also represent one or more wheel speed sensors which may be used in anti-lock breaking system (ABS) applications, vehicle stability control systems, and the like.

The controller 32 preferably comprises a programmable microprocessor 36 in communication with (i.e., coupled to) various computer readable storage media 38 via at least one data and control bus 40. The computer readable storage media 38 may include any of a number of devices such as read only memory (ROM) 42, random access memory (RAM) 44, and non-volatile (keep-alive) random access memory (NVRAM) 46.

The various types of computer-readable storage media 38 generally provide short-term and long-term storage of data (e.g., at least one lookup table, LUT, at least one operation control routine, at least one mathematical model for EGR control, etc.) used by the controller 32 to control the engine 10 and the EGR valve 13. The computer-readable storage media 38 may be implemented by any of a number of known physical devices capable of storing data representing instructions executable by the microprocessor 36. Such devices may include PROM, EPROM, EEPROM, flash memory, and the like in addition to various magnetic, optical, and combination media capable of temporary and permanent data storage.

The computer-readable storage media 38 may include data representing program instructions (e.g., software), calibrations, routines, steps, methods, blocks, operations, operating variables, and the like used in connection with associated hardware to control the various systems and subsystems of the engine 10, the EGR valve 13, the VGT 17, and the vehicle. The engine/vehicle/EGR system control logic is generally implemented via the controller 32 based on the data stored in the computer-readable storage media 38 in addition to various other electric and electronic circuits (i.e., hardware, firmware, etc.). The computer readable storage media 38 generally have instructions stored thereon that may be executable by the controller 32 to control the internal combustion engine 10, including the EGR valve 13 and a variable geometry device (e.g., turbine vanes) on the turbocharger 17, and to determine the level of the virtual sensor signal AF. The program instructions may direct the controller 32 to control the various systems and subsystems of the vehicle where the engine 10 is implemented, with the instructions being executed by microprocessor 36, and optionally, instructions may also be executed by any number of logic units 50. The input ports 24 may receive signals from the various sensors and switches, and the controller 32 may generate signals (e.g., the signals ACT and ADJ) at output ports 48. The output signals are generally presented (or transmitted) to the various vehicle components (e.g., the EGR valve 13 actuator, the VGT 17 actuator, other actuators, indicators, and the like).

The actuators may include various engine components which are operated via associated control signals from the controller 32. The various actuators may also provide signal feedback to the controller 32 relative to the actuator operational state (e.g., via a respective sensor), in addition to feedback position or other signals used to control the actuators. The actuators preferably include a plurality of fuel injectors which are controlled via associated (or respective) solenoids to deliver fuel to the corresponding cylinders 12. The actuators may include at least one actuator that may be implemented to control the EGR valve 13 in response to the signal ACT, and at least one actuator to control the turbine vanes (i.e., vary the geometry of) of the VGT 17 in response to the signal ADJ.

A data, diagnostics, and programming interface 54 may also be selectively connected to the controller 32 via a bus and connector 56 to exchange various information therebetween. The interface 54 may be used to change values within the computer readable storage media 38, such as configuration settings, calibration variables, instructions for EGR and engine control, at least one constant that corresponds to the EGR valve 13 geometry, at least one constant that corresponds to the VGT 17, and the like.

As used throughout the description of the present invention, at least one selectable (i.e., programmable, predetermined, modifiable, etc.) constant, limit, set of calibration instructions, calibration values (i.e., threshold, level, interval, value, amount, duration, etc.) or range of values may be selected by any of a number of individuals (i.e., users, operators, owners, drivers, etc.) via a programming device, such as the device 54 selectively connected via an appropriate plug or connector 56 to the controller 32.

Rather than being primarily controlled by software, the selectable or programmable constant and limit (or range) values may also be provided by an appropriate hardware circuit having various switches, dials, and the like. Alternatively, the selectable or programmable limit and range may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In at least one mode of operation, the controller 32 may receive signals from the various vehicle sensors and switches, and execute control logic embedded in hardware and software to control the engine 10, the EGR valve 13, the VGT 17, and the like. One or more of the sensors (e.g., the engine inlet air mass flow sensor 70) may be virtual sensors using control logic embedded in hardware and software. In one example, the controller 32 is implemented as at least one implementation of a DDEC controller available from Detroit Diesel Corporation, Detroit, Mich. Various other features of the DDEC controller are described in detail in a number of different U.S. patents assigned to Detroit Diesel Corporation. However, the present invention may be implemented in connection with any appropriate controller to meet the design criteria of a particular application.

Control logic may be implemented in hardware, firmware, software, or combinations thereof. Further, control logic may be executed by the controller 32, in addition to and by any of the various systems and subsystems of the vehicle or other installation where the controller 32 is implemented. Yet further, although in a preferred embodiment, the controller 32 includes the microprocessor 36, any of a number of known programming and processing techniques, algorithms, steps, bocks, processes, routines, strategies and the like may be implemented to control the engine 10, the EGR valve 13, the VGT 17, and simulate the virtual sensor 70 in accordance with the present invention. Further, the engine controller 32 may receive information in a variety of ways. For example, engine 10 systems information may be received over a data link, at a digital input, or at a sensor input of the engine controller 32.

The controller 32 generally provides enhanced engine performance by controlling the variable flow EGR valve 13 and the VGT 17. The amount of exhaust gas to be recirculated is generally controlled by the EGR valve 13. In accordance with the present invention, the EGR valve 13 comprises a variable flow valve that is electronically controlled by the controller 32. There may be many possible configurations for a controllable EGR valve, and embodiments of the present invention are not limited to any particular structure for the EGR valve 13. Further, various sensors located at the EGR valve 13, on the engine 10, and in connection with corresponding systems, subsystems, and components may detect temperature and differential pressure to provide for determination of the exhaust gas mass flow rate through the EGR valve 13 via the controller 32.

In addition, various sensor configurations may be implemented in various parts of the exhaust flow paths of the engine 10 to provide the controller 32 with appropriate signals to determine the various respective mass flow rates throughout the exhaust system (e.g., exhaust gas flow 58 from the exhaust manifold 14), including flow through the EGR system (e.g., flow 64) and flow through the turbocharger 17 compressor (e.g., flow 60), and any other flows to meet the design criteria of a particular application.

In particular, sensors are generally implemented to provide signals to respective input ports 24 that correspond to (or relate to) EGR 13 valve and actuator position, intake manifold 15 air pressure intake manifold temperature, exhaust manifold 14 exhaust gas pressure, turbocharger 17 compressor inlet air temperature, turbocharger 17 compressor inlet air pressure, a physical or virtual sensor 70 that presents a signal (e.g., the signal AF) that corresponds to air mass flow through the engine 10, and the sensor 74 that presents a signal (e.g., the signal PD) that corresponds to pressure across the DPF 20.

In at least one example, a cooler 62 may be implemented to cool the charge (i.e., compressed) air coming from the turbocharger 17. Similarly, in at least one example, a cooler 68 may be implemented to cool the exhaust gas flow from the EGR valve 13 to the intake manifold 15 through the EGR system prior to reintroduction to engine 10.

Embodiments of the present invention include control logic that processes various input signals representing various engine (or component, system, subsystem, etc.) conditions, and in turn, provides at least one EGR command (or control) signal (e.g., ACT) and at least one VGT control signal (e.g., ADJ). The EGR command (or control) signal ACT generally controls a position of the variable flow EGR valve 13 to control gas flow through the EGR exhaust gas flow path 64. The EGR position sensor generally presents a signal (e.g., POSIT) to at least one of the input ports 24. The position signal POSIT generally corresponds to (i.e., is related to) the position (e.g., percentage of opening or closing) of the EGR valve 13. The VGT control signal ADJ generally controls a position of the variable vane turbocharger 17 turbine vanes to control flow through the VGT exhaust gas flow path 60. The VGT position sensor generally presents a signal (e.g., VAPOS) to at least one of the input ports 24. The position signal VAPOS generally corresponds to the position of the VGT 17 turbine vanes.

In one embodiment, the controller 32 controls various components such as a fuel pump to transfer fuel from a source to a common fuel rail or manifold. However, in another example, the present invention may be implemented in connection with a direct injection engine. Operation of solenoids generally controls delivery of the timing and duration of fuel injection (i.e., an amount, timing and duration of fuel). While the representative engine and control system 10 illustrates an example application environment of the present invention, as noted previously the present invention is not limited to any particular type of fuel or fueling system and thus may be implemented in any appropriate engine and/or engine system to meet the design criteria of a particular application.

The sensors, switches and actuators may be implemented to communicate status and control information to the engine operator via a console (not shown). The console may include various switches in addition to indicators. The console is preferably positioned in close proximity to the engine operator, such as in a cab (i.e., passenger compartment, cabin, etc.) of the vehicle (or environment) where the system 10 is implemented. The indicators may include any of a number of audio and visual indicators such as lights, displays, buzzers, alarms, and the like. Preferably, one or more switches may be used to request at least one particular operating mode, such as climate control (e.g., air conditioning), cruise control or PTO mode, for example.

In one example, the controller 32 includes control logic to control at least one mode of operation of the engine 10 and at least one mode of operation of the EGR 13 valve and actuator system, and the VGT 17 vane and actuator system. In another example, the controller 32 may be implemented as an EGR controller and engine control may be performed via another controller (not shown). Modes of engine 10 operation that may be controlled include engine idle, PTO operation, engine shutdown, maximum permitted vehicle speed, maximum permitted engine speed (i.e., maximum engine RPM), whether the engine 10 may be started (i.e., engine start enable/disable), engine operation parameters that affect engine emissions (e.g., timing, amount and duration of fuel injection, EGR control, VGT control, exhaust air pump operation, etc.), cruise control enable/disable, seasonal shutdowns, calibration modifications, and the like.

The signal POSIT generally provides a real-time EGR valve 13 position indication that may be integrated (e.g., combined, processed, etc.) with EGR flow dynamics and VGT 17 operation. The signal AF generally provides a real-time engine 10 air mass flow indication that may be integrated (e.g., combined, processed, etc.) with EGR flow dynamics and VGT 17 operation. The signal VAPOS generally provides a real-time VGT 17 turbine vane position indication that may be integrated (e.g., combined, processed, etc.) with EGR flow dynamics and VGT 17 operation.

The controller 32 (e.g., the microprocessor 46 and the memory 38) may be programmed with at least one mathematical model that may continuously capture (i.e., monitor) EGR flow dynamics, VGT 17 vane position, and pressure drop across the DPF 20 (via a number of input signals presented by sensors to the respective input ports 24). The controller 32 may continuously generate the real-time EGR valve 13 control signal ACT and the VGT 17 control signal ADJ to continuously adjust (i.e., set, modify, control, select, etc.) the EGR valve 13 position (or opening) and the VGT 17 turbine vane position (i.e., VGT geometry), respectively, in real-time.

That is, a desired change for EGR valve discharge coefficient is added to the discharge coefficient calculated as the preview sample time to continuously generates an EGR actuator position control signal (e.g., the signal ACT). The value (i.e., amount, level, etc.) that is determined (i.e., calculated, set, etc.) for the signal ACT generally integrates (e.g., combines, processes, etc.) the EGR valve 13 position feedback, EGR valve actuator delay, intake air and exhaust gas flow dynamics (e.g., delays) in connection with EGR valve discharge coefficient relationships as determined in response to the EGR valve 13 position (i.e., the signal POSIT).

The present invention generally provides for controlling the exhaust gas such as NOx emissions from a compression ignition internal combustion engine (e.g., the engine 10) having a variable geometry turbocharger (e.g., the VGT 17) by determining turbine pressure inlet and air mass flow into the engine, vane position of the VGT to provide air mass flow increase in response to turbine pressure inlet charges.

The controller 32 generally control positioning the vanes of the VGT 17 such that the air mass flow through the engine 10 is increased linearly, and a decrease in EGR flow is controlled proportionally to the air mass flow increase.

The controller 32 generally provides calibrating limits on the amount of air flow increase and the amount of EGR flow decrease to provide substantially the same exhaust gas emissions during steady state and transitional modes of operation of the engine 10.

The controller 32 generally determines rate of change of the air mass flow, and prevents overclosure of the VGT 17 vanes by stopping the closing of the vanes of the VGT 17 when a positive rate of change of the air mass flow occurs.

The controller 32 generally determines engine NOx emissions, and controls the position of the VGT 17 vanes in response to the engine NOx emissions. The controller 32 generally determines engine 10 injection timing, and controls the position of the VGT 17 vanes in response to the engine injection timing.

The controller 32 may provide hysteresis (i.e., the lagging or retardation of an effect behind its cause) to control of the position of the VGT 17 vanes to minimize VGT 17 vane opening and closing transitions. The hysteresis may include at least one of providing a predetermined time of operation at any mode prior to the transition to another mode, and determining a change in the level of any of the signals AF, BP (calculated turbine inlet pressure) and PD by respective predetermined amounts prior to presenting the signal ADJ.

Figure 3:
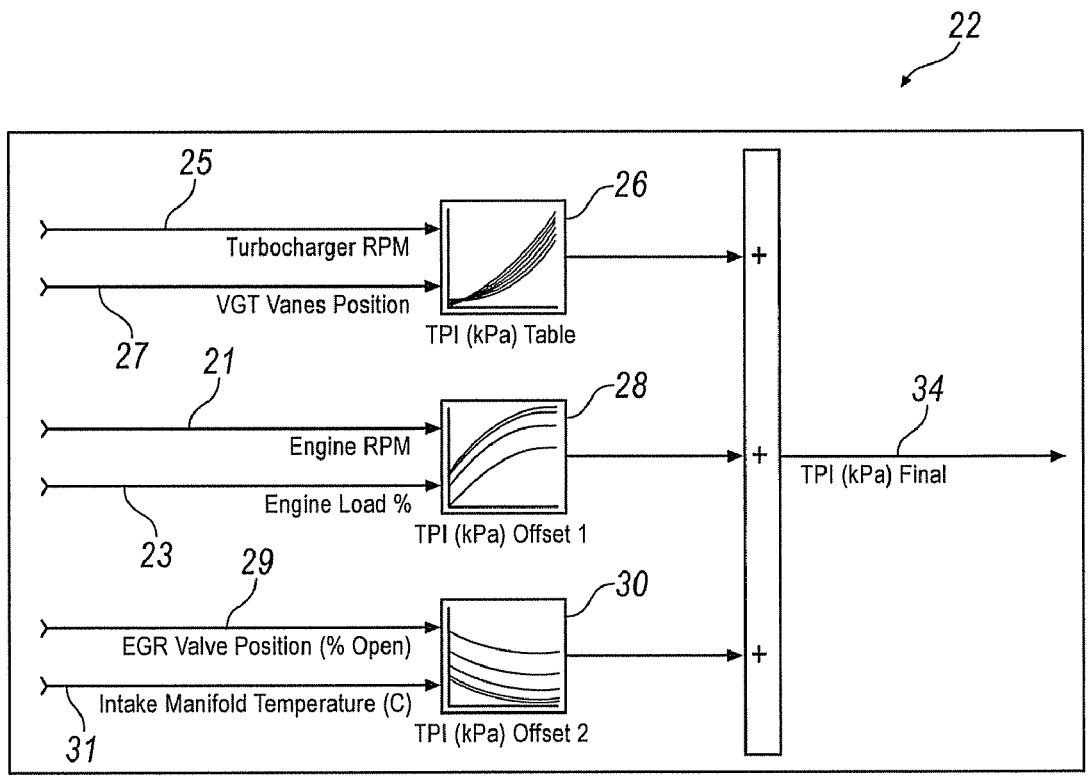
FIG. 3 is a schematic representation of the Six-Dimensional Turbine Inlet Pressure algorithm of the present invention.

FIG. 3 is an illustration of a six-dimensional turbine inlet pressure algorithm useful in the practice of the present invention.

Specifically, the algorithm 22 used to calculate pressure (or turbine inlet pressure, TPI) relies on a set of three (3) two-dimensional tables. The primary table is the base TPI table 26. Table 26 utilizes, as input TS, the turbocharger RPM 25 and the variable geometry turbocharger (VGT) vane position 27.

The second and third tables (28 and 30, respectively) are offset components. Table 28 utilizes engine RPM 21 and engine load 23 as inputs, and table 30 utilizes EGR valve position 29 and intake manifold temperature 31 as inputs.

The algorithm uses these input signals from proven, reliable sensors (engine RPM, turbocharger RPM, intake manifold temperature, etc.). The ECM control signals (VGT vanes position, EGR valve position, engine load) are also included. Regarding the VGT and EGR valve, actuator position sensing is not required, as the control signal (typically a pulse width modulated control output (PWM), 0 to 5 volts) can be accurately correlated to physical actuator position.

Generating the tables involves gathering existing engine data for the signals listed above, and using a typical second order mapping technique. The under-lying mapping model is as follows:

$$z = c_1 x^2 + c_2 x + c_3 y^2 + c_4 y + c_5 x^2 y^2 + c_6 xy + c_7 x^2 y + c_8 xy^2 + c_9$$

where:
z is the table output
x is the table's first input (row input)
y is the table's second input (column input)
$c_1 \ldots c_9$ are the coefficients of the polynomial
The mapping assumes a fixed model of the type:

$$z = a*c$$

where a is the following vector:

a=[$x^2 xy^2 yx^2 y^2 xyx^2 yxy^2 1$]

and solves for the coefficients of the vector c:

$$c = [a'*a]^{-1} a'*z$$

The values from tables 1, 2 and 3 are added together to determine the final turbine inlet pressure 34.

Figure 4:
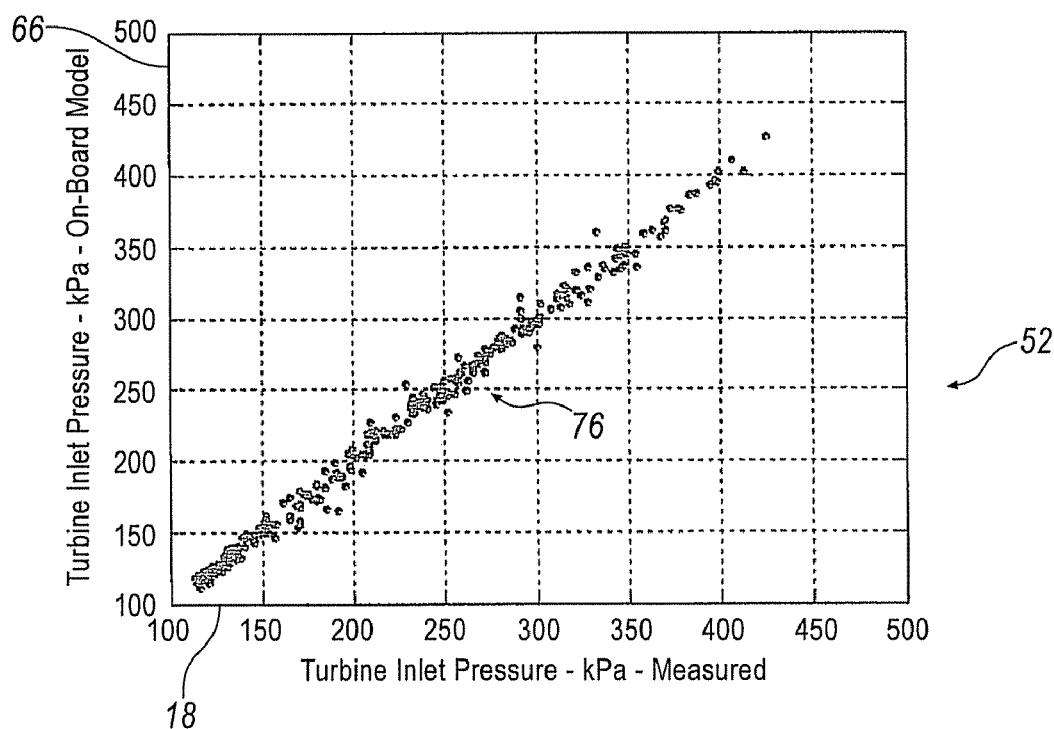
FIG. 4 is a graphic representation of the comparison between measured and calculated turbine inlet pressure, using the empirical method of the present invention.

FIG. 4 is a graphic representation of a comparison between measured and calculated turbine inlet pressure using the empirical method described in reference to FIG. 3 above.

Specifically, graph 52 is shown with x axis 18 measured turbine inlet pressure in kPa units. Y axis 66 is turbine inlet pressure based upon the on-board model. Data points 76 clearly demonstrate that on-board model correlates to the measured turbine inlet pressure.

Those skilled in the art will recognize that the words used herein are words of description and not words of limitation. Many variations of the described embodiments are possible without departing from the scope and spirit of the invention as set forth in the appended claims.

The estimated turbine inlet pressure is included in the EGR and VGT control logic to modulate the air and EGR flow rate during steady-state and transient engine operation. Turbine inlet pressure is used to further estimate the turbocharger flow rate and EGR flow rate, thereby enabling precise EGR valve and VGT vanes throughout the engine operating range.

The words used herein are words of description and not words of limitation. Those skilled in the art will recognize that many variations and modifications are possible without departing from the scope and spirit of the invention as set forth in the appended claims.

We claim:

1. A method to estimate real time exhaust pressure in an internal combustion engine with an exhaust gas recirculation system (EGR), an ECM with memory and a variable Geometry turbocharger (VGT) with an inlet, to control EGR flow rate and combustion emissions, comprising:
   determining VGT turbocharger vane position;
   determining engine RPM;
   determining engine load;
   determining EGR valve position;
   determining intake manifold temperature;
   determining turbocharger RPM; and
   using the above six variables as inputs to three two-dimensional tables that are summed to estimate a final turbocharger inlet pressure and to control exhaust emissions.

2. The method of claim 1, wherein turbocharger RPM, engine RPM, VGT vane position, engine load, EGR valve position and intake manifold temperature are in at least one table within memory of the ECM; said table generated according to the formula:

$$z = c_1 x^2 + c_2 x + c_3 y^2 + c_4 y + c_5 x^2 y^2 + c_6 xy + c_7 x^2 y + c_8 xy^2 + c_9$$

wherein:
   z is the table output,
   x is the first input to the table,
   y is the second input to the table, and
   $c_1; c_2; c_3; c_4; c_5; c_6; c_7; c_8; c_9$ are coefficients of the polynomial used underlying turbine inlet pressure model.

3. The method of claim 2, further including the steps of:
   assuming a fixed model z=a*c
   wherein a is the vector a=[$x^2$, $xy^2$, y, $x^2 y^2$, xy, $x^2 y$, $xy^2$, 1]; and
   solving for the coefficients of the vector c
      wherein c=[a'*a]$^{-1}$*a'*z–.

4. The method of claim 1, wherein the exhaust emissions are NOx.

5. The method of claim 1, wherein EGR valve position is measured as a function of percent the EGR valve is open.

* * * * *